No. 826,979. PATENTED JULY 24, 1906.
J. WILKINSON.
VALVE CONTROLLING MECHANISM.
APPLICATION FILED JULY 3, 1905.
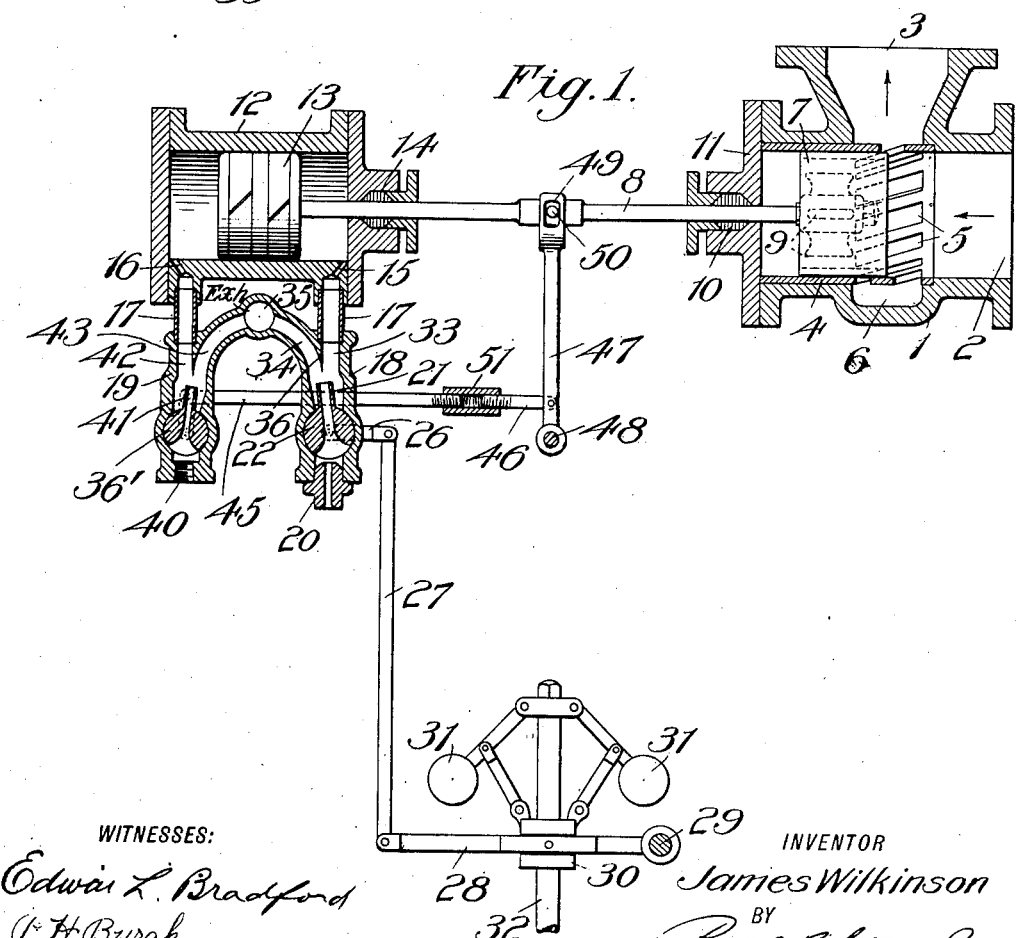
WITNESSES:
Edward L. Bradford
O. H. Burch
INVENTOR
James Wilkinson
BY
ATTORNEY

UNITED STATES PATENT OFFICE.

JAMES WILKINSON, OF PROVIDENCE, RHODE ISLAND, ASSIGNOR TO WILKINSON TURBINE COMPANY, A CORPORATION OF ALABAMA.

VALVE-CONTROLLING MECHANISM.

No. 826,979.      Specification of Letters Patent.      Patented July 24, 1906.

Application filed July 3, 1905. Serial No. 268,203.

*To all whom it may concern:*

Be it known that I, JAMES WILKINSON, a citizen of the United States, residing at Providence, in the county of Providence and State of Rhode Island, have invented new and useful Improvements in Valve-Controlling Mechanism, of which the following is a specification.

My invention relates to valve mechanism wherein a jet of steam or other fluid under pressure is utilized to provide a valve-actuating power whose potential is determined by the location of the valve or its operating-piston and which coöperates with a second controllable power to determine the position of the valve.

The utilization of a jet of fluid-pressure under the control of a movable nozzle to operate valves and valve-motors constitutes the subject-matter of numerous patents already issued to me.

One object of my present invention is to utilize this means of producing a substantially static pressure of varying potential to provide a resistance which, after the fashion of a large spiral spring, will oppose a controller-power of varying potential and cause the valve to assume intermediate operating positions. This I effect by providing a controller-nozzle which is operated by the valve or piston upon which its controlling effect is exerted and which therefore moves in correspondence with any movement of the valve. The resulting movements of the fluid-jet act through suitable instrumentalities to gradually raise or lower the pressure, opposing the valve-controller power to a degree determined by the location of the valve, which will thus balance itself between equal powers.

It is a further object of my present invention to adapt the principle of jet control to regulate by two nozzles the pressures on both sides of a valve-actuating piston, it being understood that the reference to a valve-actuating piston is used broadly and is intended to cover the direct operation of the valve itself or the use of any pressure-actuated device for shifting a valve, whether forming a part of the valve itself or connected thereto. This jet control is preferably effected by adjusting the position of one of the nozzles, which I term the "controller-nozzle," to produce a definite pressure in one end of the valve-piston cylinder, which as it exceeds or falls below the pressure produced by the other or compensating nozzle in the opposite end of the cylinder causes the piston to change its position. This movement of the piston is transmitted to the compensating nozzle which is adjusted thereby until it produces a pressure which will balance that produced by the controller-nozzle, when the movement of the valve and piston will cease until again unbalanced by the controller-nozzle. By providing a governing means to adjust the controller-nozzle the valve may be definitely and positively moved to any desired operating position, where it admits a volume of fluid-pressure proportioned to the motor's load and is definitely held there between balanced pressures, it being noted that the degree of the balanced pressures varies with the position of the valve from a partial vacuum to substantially the pressure of the controller-jets.

My invention further comprises the novel combination of a stationary main nozzle with an adjustable guide-nozzle which is practically balanced to reduce the work on the governor.

My invention further comprises the details of construction and arrangement of parts hereinafter described, and illustrated in the accompanying drawings, in which—

Figure 1 illustrates a piston-operated valve provided with a controller mechanism shown in vertical section and constructed in accordance with my invention. Fig. 2 is a detail view of the secondary controller-casing. Fig. 3 is a similar view of the primary controller-casing. Figs. 4 and 5 are charts indicating the curves of pressure in two ends of the cylinder, Fig. 1, as the controller-nozzle moves to effect the opening or closing of the valve.

Similar reference-numerals refer to similar parts throughout the drawings.

The valve-casing 1 is provided with an inlet-port 2 and outlet-port 3, disposed at right angles. The casing is reduced to receive a grated valve-shell 4, provided with a plurality of ports 5, through which fluid-pressure enters a circular chamber 6, formed in the casing and communicating with the discharge-port 3. The main valve 7, of the balanced-piston type, is disposed within the casing and moved back and forth over the ports 5 by means of a piston-rod 8, connected to the valve by spiders 9. The piston-rod 8 projects through a stuffing-box 10 in a removable head 11 for the valve-casing, the shell 4 and valve 9 being disposed in place before the head is connected to the casing. The construction of the valve and valve-casing forms no part of my present invention and may therefore be varied at will.

The controller mechanism for the valve comprises a cylinder 12, within which a piston 13 is disposed and connected to the valve-stem 8, which projects through a stuffing-box 14 in the front head of the cylinder. The cylinder is provided with inlet-ports 15 and 16 for the controller fluid-pressure, disposed at each end and so arranged that they will not be closed by the ends of the piston 13, which are beveled, when at either extreme of its travel. These ports 15 and 16 are connected by right and left threaded nipples 17 to the primary and secondary controller-casings 18 and 19, respectively.

The primary controller-casing is provided at its inlet end with a stationary jet-nozzle 20, secured therein in any suitable manner and supplied with fluid-pressure of any character from any convenient source. Immediately above this nozzle 20 the casing is enlarged to receive a movable guide-nozzle comprising a nozzle 21, secured to or formed integral with a cylindrical nozzle-holder 22, which is provided with a transverse passage which flares at the end opposite the nozzle 20 and opens into the nozzle 21. The holder is inserted through a side opening in the casing and mounted in circular seats which serve as bearings for its ends. The guide-nozzle is screwed into an opening through the holder after same is in place, the nozzle being inserted through one of the fluid-passages. The guide-nozzle may be readily moved by means of a stem 23, which projects through a stuffing-box 24 in the plate 25, which closes the opening in the casing through which the nozzle-holder was inserted. This movement may be effected by hand, if desired, or, as shown, by the use of a crank 26, connected by link 27 to an arm 28, journaled on a stationary pin 29 and connected to a sliding collar 30, operated by centrifugal governor-weights 31, driven by a shaft 32, which derives its motion in any desired manner from the machine to be governed. As the guide-nozzle is rocked in its bearings it is brought opposite to a passage 33, communicating through the nipple 17 with the cylinder-port 15 or to the passage 34, leading to the exhaust-port 35. These ports 34 and 35 are divided by a knife-edge partition 36, disposed close to the jet-nozzle 25, the operation being that this partition acts to divert more or less of the jet of pressure into the cylinder or to the exhaust, according to the position of the nozzle. When the guide-nozzle is discharging a jet of fluid directly into the passage 33, the pressure at the right end of the cylinder, due to the impact action of the jet, will be substantially that of the controller-pressure. As the nozzle is moved to the left the impact action decreases, while the ejector action of the jet in the passage 34 increases, the pressure in the right end of the cylinder gradually decreasing until a partial vacuum will exist therein, due to the full ejector action of the jet in the passage 34.

The secondary controller-casing 19 is provided with a nozzle-holder 36′, similar to 22, but of smaller dimensions and similarly mounted in the casing. Its operating-stem 37 projects through plate 38, similar to 25, and is provided with a stuffing-box 39. Fluid-pressure from any desired source is supplied to the casing through a port 40 below the nozzle-holder, whose jet-nozzle 41 is disposed so as to discharge the jet into a passage 42, communicating through nipple 17 and port 16 with the left end of the cylinder or into a passage 43, communicating with the exhaust through port 35 or in any other manner. The jet of fluid-pressure controlled by the nozzle 41 will operate to raise and lower the pressure in the left end of the cylinder in the same manner as the jet controlled by the guide-nozzle controls the pressure in the right end of the cylinder. The reverse disposition of the injector and ejector ports 33 34 and 42 43 necessitates the movement of the primary and secondary nozzles in opposite directions to produce the same effects. This arrangement is desirable only to enable both controller-casings to exhaust through a common port.

To produce intermediate operating positions for the piston 13, such as that in which it is illustrated, I mount a crank 44 on the stem 37 of the secondary nozzle and connect this crank by means of arms 45 and 46 to a pivoted arm 47, mounted on a stationary pin 48 and provided with an elongated slot 49 in its free end, which is engaged by a pin 50, carried by the valve-stem 8. The arms 45 and 46 are threaded at their adjacent ends and are connected by a turnbuckle or reversely-threaded sleeve 51 for the purpose of adjusting the connection between the piston-operated arm 47 and the secondary nozzle. This arrangement is important to enable the secondary nozzle to be adjusted so that it acts with the lead or lag requisite to produce by coöperation with the primary controller means any desired speed or length of stroke of the valve, thereby securing the most sensitive governing effects as to speed or load. The secondary controller-nozzle will move in correspondence with the motor-piston and will act to cause a variation of pressure in the left end of the cylinder that will practically correspond with the action of a large spiral spring, if such were used at this point, to resist the movement of the piston, the action of the jet being that as the piston moves to the left the injector action of the nozzle 41 increases, thereby raising the pressure in the left end of the cylinder in the manner shown by the curve in Fig. 4, where D represents the distance traveled by the piston, and P the pressure in the left end of the cylinder. The movement of the secondary nozzle to the left increases its injector action and gradually raises the pressure to a degree determined by the position of the piston along the line D. If now the valve be in its closed position and both controller-nozzles discharging into the passages 34 and 43, there will be no pressure in the cylinder 12. If it is desired to open the valve partially, the guide-nozzle 25 is shifted to the right and a small portion of its pressure diverted into the right end of the cylinder. This will start and move the piston to the left, which movement will bring the secondary nozzle in position to divert a part of its pressure into the left end of the cylinder. As this latter pressure increases as the piston moves while the pressure at the right end of the cylinder may remain constant, it follows that the movement of the piston will thus bring the pressures on its opposite faces to an equilibrium, when it will be balanced and stationary. Any further movement of the guide-nozzle either to the right or left will act in the same way by unbalancing the piston in either direction to cause a shifting movement of the piston, which will act to balance itself in other positions through the compensating action of the secondary nozzle. The piston will thus be capable of asssuming stationary positions at any point in its travel, it being noted that the degree of the balancing pressures varies from the partial vacuum at one end of the cylinder to substantially the same degree of pressure as that of the controller-pressures at the other end of the cylinder. This novel effect as produced by fluid-pressure means is broadly new to my present invention, and I desire to protect the same without limitation to the devices illustrated for producing it.

Having thus described my invention, what I claim as new, and desire to secure by Letters Patent, is—

1. In an elastic-fluid turbine, the combination with an admission-port, a valve therefor, a controllable power means to move said valve in one direction and fluid-pressure means, tending to move said valve in the other direction, whose power varies directly in response to the movements of said valve.

2. A valve-controlling mechanism comprising a valve, a movable nozzle which controls, by a jet of fluid, the pressure acting to move said valve in one direction, means to move said nozzle in correspondence with the valve's movements, and a variable power means to oppose the action of said pressure.

3. Valve mechanism comprising a valve, means to apply a controllable power to move the valve in one direction, and fluid-pressure means to move said valve in the other direction whose potential is determined by the position of the valve.

4. In a valve-controlling mechanism, a fluid-controlled valve, in combination with a jet-nozzle operably connected to said valve, means coöperating with said nozzle to create a pressure of varying potential for operating said valve, and controller devices to move said valve in opposition to said pressure.

5. In a valve-controlling mechanism, the combination with a fluid-pressure-operated valve, of a nozzle to control, by a jet of fluid, a valve-controlling pressure, and adjustable means to move said nozzle in correspondence with said valve's movements.

6. A valve-controlling mechanism comprising a fluid-pressure-actuated valve, and a controller-nozzle for regulating a valve-actuating pressure which is operably and adjustably connected to parts movable with the valve.

7. The combination of a valve and operating mechanism therefor comprising a piston, a cylinder therefor, a movable nozzle through which a jet of fluid-pressure flows, means to move said nozzle in correspondence with the valve's movements, means utilizing the injector and ejector effect, of a jet of fluid flowing through said nozzle to vary the pressure in one end of said cylinder, and means to apply a controllable power to move said valve and piston in opposition to said jet-controlled pressure.

8. A fluid-pressure-controller mechanism for a valve comprising a cylinder and piston for operating said valve, controller-chambers communicating with each end of said cylinders, and means in each controller-chamber which divert a freely-flowing stream of fluid to control the operation of said valves.

9. In a valve-controlling mechanism, a fluid-pressure-actuated valve, a piston connected thereto, and means utilizing simultaneously the impact effect of freely-flowing streams of fluid to act on said piston and control the operation of said valve.

10. In combination, a valve, a fluid-motor for operating said valve, conduits for supplying valve-actuating fluid to said motor, a controller-nozzle for each conduit adapted to deliver a jet of fluid thereinto, and means to control the potential of the fluid-pressure in said motor by varying the relative position of said nozzles and conduits.

11. In a valve-controlling mechanism, the combination with a piston-actuated valve, of a cylinder for said piston, a nozzle moved by said piston for controlling, by a jet of fluid, the pressure in one end of said cylinder, and a nozzle movable in response to a governor for controlling by a fluid-jet the pressure in the other end of said cylinder.

12. The combination of a slide-valve, a fluid-motor for operating said valve comprising a cylinder and piston, and mechanism for controlling the pressures in both ends of the cylinders independently which comprise two controller-chambers communicating each with an end of said cylinder and an exhaust-port, means to supply fluid-pressure to said chambers and movable nozzles to direct said fluid-pressure in the form of jets to raise or lower the pressures in the ends of said cylinder, one of said nozzles being adjusted in correspondence with the movement of the piston while the other nozzle moves in correspondence with the movement of a governor.

13. In a valve-controlling mechanism, fluid-pressure means utilizing the injector and ejector effect of a jet of freely-flowing fluid to control the operation of said valve, said means comprising a stationary nozzle and a movable guide-nozzle coöperating therewith.

14. The combination with a valve, of devices for controlling its operation comprising a cylinder, a fluid-controller chamber communicating therewith and with an exhaust, a stationary nozzle in said chamber through which a jet of fluid flows under pressure, a balanced guide-nozzle having a flaring port to receive the jet from said stationary nozzle, speed-governor-controlled means to move said guide-nozzle, and means to utilize the injector and ejector effect of the jet of fluid under the control of said guide-nozzle to produce a variable controlling pressure.

15. In a valve-controlling mechanism, a piston-operated valve, means utilizing simultaneously the impact effect of two freely-flowing streams of fluid under pressure to operate said piston-valve, and speed-responsive means to independently regulate said streams and thereby control the operation of said valve.

In testimony whereof I have hereunto set my hand in presence of two subscribing witnesses.

JAMES WILKINSON.

Witnesses:
   C. H. W. MANDEVILLE,
   P. H. JILLSON.